(12) United States Patent
Zhao et al.

(10) Patent No.: US 10,069,303 B2
(45) Date of Patent: Sep. 4, 2018

(54) POWER GENERATION SYSTEM AND METHOD WITH ENERGY MANAGEMENT

(71) Applicant: General Electric Company, Schenectady, NY (US)

(72) Inventors: Tong Zhao, Shanghai (CN); Rong Li, Shanghai (CN); Xu Fu, Shanghai (CN); Bernard P. Landa, Schenectady, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 204 days.

(21) Appl. No.: 15/094,162

(22) Filed: Apr. 8, 2016

(65) Prior Publication Data
US 2016/0308361 A1    Oct. 20, 2016

(30) Foreign Application Priority Data
Apr. 14, 2015    (CN) .......................... 2015 1 0176635

(51) Int. Cl.
*H02J 1/12*    (2006.01)
*H02J 3/38*    (2006.01)
(Continued)

(52) U.S. Cl.
CPC ................ *H02J 3/381* (2013.01); *H02J 1/12* (2013.01); *H02J 3/386* (2013.01); *H02J 7/0068* (2013.01);
(Continued)

(58) Field of Classification Search
CPC .................................... H02J 1/12; H02J 7/345
See application file for complete search history.

(56) References Cited

U.S. PATENT DOCUMENTS 7,002,260 B2 *    2/2006    Stahlkopf ................ H02J 3/32
                                                             290/44
7,608,937 B1    10/2009    Altenschulte
(Continued)

FOREIGN PATENT DOCUMENTS

CN    103208810 A    7/2013
CN    103441539 A    12/2013
(Continued)

OTHER PUBLICATIONS

European Search Report and Written Opinion issued in connection with corresponding EP Application No. 16163936.4 dated Sep. 21, 2016.
(Continued)

*Primary Examiner* — Thienvu Tran
*Assistant Examiner* — Pinping Sun
(74) *Attorney, Agent, or Firm* — Douglas D. Zhang; GE Global Patent Operation (57) ABSTRACT

A power generation system is provided. The system includes a bus, at least two converters, an energy-type energy storage unit (ES), a power-type energy storage unit (PS) and a controller. The ES and the PS are coupled in parallel to the bus through corresponding converters of the at least two converters. The controller is configured to control the ES and the PS through the corresponding converters in at least two conditions during a charging mode and a discharging mode: when a power for the ES and PS is below a power threshold, control the power to flow between the ES and the bus; and when the power is above the power threshold, control a part of the power to flow between the ES and the bus and another part of the power to flow between the PS and the bus. And a method for generating power is also provided.

20 Claims, 8 Drawing Sheets

(51) Int. Cl.
| | |
|---|---|
| H02J 7/34 | (2006.01) |
| H02J 7/00 | (2006.01) |
| H02M 3/04 | (2006.01) |
| H02M 7/04 | (2006.01) |
| H02M 7/44 | (2006.01) |

(52) U.S. Cl.
CPC ............... *H02J 7/345* (2013.01); *H02M 3/04* (2013.01); *H02M 7/04* (2013.01); *H02M 7/44* (2013.01); *Y02E 10/763* (2013.01)

(56) References Cited

U.S. PATENT DOCUMENTS

| | | | |
|---|---|---|---|
| 7,786,620 B2* | 8/2010 | Vuk | H01M 10/4264 307/66 |
| 7,952,232 B2 | 5/2011 | Burra et al. | |
| 8,178,986 B2* | 5/2012 | Vyas | F03D 7/043 290/44 |
| 8,227,929 B2 | 7/2012 | Burra et al. | |
| 8,638,061 B2 | 1/2014 | Moore et al. | |
| 8,688,281 B2 | 4/2014 | Viassolo et al. | |
| 8,754,547 B2 | 6/2014 | Jin et al. | |
| 8,860,236 B2 | 10/2014 | Nasiri | |
| 8,860,359 B2 | 10/2014 | Cao et al. | |
| 2008/0218104 A1* | 9/2008 | Lukic | B60L 11/005 318/139 |
| 2009/0212626 A1* | 8/2009 | Snyder | B60K 6/28 307/10.1 |
| 2013/0056986 A1 | 3/2013 | Jeong et al. | |
| 2013/0099581 A1* | 4/2013 | Zhou | H02J 1/12 307/82 |
| 2014/0181540 A1* | 6/2014 | Hua | H01M 10/44 713/300 |
| 2014/0236883 A1* | 8/2014 | Ye | G06N 7/02 706/52 |
| 2014/0316592 A1 | 10/2014 | Haj-Maharsi et al. | |
| 2014/0354234 A1* | 12/2014 | Sudan | H02J 7/34 320/127 |
| 2015/0069839 A1* | 3/2015 | Tengner | H02J 3/32 307/48 |
| 2015/0102667 A1* | 4/2015 | Zhao | B60L 11/1803 307/10.1 |
| 2016/0065003 A1* | 3/2016 | Preston | H02M 7/04 307/64 |
| 2017/0201097 A1* | 7/2017 | Temkin | H02J 3/28 |

FOREIGN PATENT DOCUMENTS

| | | |
|---|---|---|
| CN | 103178538 B | 12/2014 |
| CN | 103236708 B | 12/2014 |
| CN | 103401262 B | 12/2014 |
| EP | 2110549 A2 | 10/2009 |

OTHER PUBLICATIONS

Gao et al., "Power enhancement of an actively controlled battery/ultracapacitor hybrid", IEEE Transactions on Power Electronics, vol. No. 20, Issue No. 1, pp. 236-243, Jan. 2005.

Rosario, "Power and Energy Management of Multiple Energy Storage Systems in Electric Vehicles", Ph.D. thesis, Department of Aerospace Power and Sensors, Cranfield University, Jun. 2007.

Carter et al., "Strategies for control of a battery/supercapacitor system in an electric vehicle", International Symposium on Power Electronics, Electrical Drives, Automation and Motion, SPEEDAM 2008, pp. 727-732, Jun. 11-13, 2008.

Li et al., "Real-Time Simulation of a Wind Turbine Generator Coupled With a Battery Supercapacitor Energy Storage System", IEEE Transactions on Industrial Electronics, vol. No. 57, Issue No. 4, pp. 1137-1145, Apr. 2010.

Babazadeh et al., "Controller design for a Hybrid Energy Storage System enabling longer battery life in wind turbine generators", North American Power Symposium (NAPS), pp. 1-7, Aug. 4-6, 2011.

Porras, "Analysis of Predictive Energy Management Strategies for Electric Vehicles", GE Global Research Public report 2011GRC1033, Dec. 2011.

Babazadeh et al., "Sizing of battery and supercapacitor in a hybrid energy storage system for wind turbines", Transmission and Distribution Conference and Exposition (T&D), IEEE PES, pp. 1-7, May 7-10, 2012.

Carter et al., "Optimizing for efficiency or battery life in a battery/supercapacitor electric vehicle", IEEE Transactions on Vehicular Technology, vol. No. 61, Issue No. 4, pp. 1526-1533, May 2012.

Mendis et al., "Active power management of a super capacitor-battery hybrid energy storage system for standalone operation of DFIG based wind turbines", Industry Applications Society Annual Meeting (IAS), IEEE, pp. 1-8, Oct. 7-11, 2012.

Gee et al., "Analysis of Battery Lifetime Extension in a Small-Scale Wind-Energy System Using Supercapacitors", IEEE Transactions on Energy Conversion, vol. No. 28, Issue No. 1, pp. 24-33, Mar. 2013.

Mendis et al., "Management of Battery-Supercapacitor Hybrid Energy Storage and Synchronous Condenser for Isolated Operation of PMSG Based Variable-Speed Wind Turbine Generating Systems", IEEE Transactions on Smart Grid, vol. No. 5, Issue No. 2, pp. 944-953, Mar. 2014.

Ma et al., "Optimal renewable energy farm and energy storage sizing method for future hybrid power system", 17th International Conference on Electrical Machines and Systems (ICEMS), Hangzhou, China, pp. 2827-2832, Oct. 22-25, 2014.

* cited by examiner

POWER GENERATION SYSTEM AND METHOD WITH ENERGY MANAGEMENT

BACKGROUND

Embodiments of the invention relate generally to an energy management system and a method, and more particularly relate to a power generation system and a method with energy management between an energy-type energy storage unit and a power-type energy storage unit.

An energy-type energy storage unit (ES), such as a battery, is usually employed to provide power and capture energy in a system, such as a wind farm power generation system. However, the ES support a high dynamic power requirement difficulty and frequent charging/discharging ES with a large power affects ES's life time. Hence, a power-type energy storage unit (PS), such as ultra-capacitor, may be a good complementary. Therefore, the ES and the PS integrating with one or more DC-DC converters may be a suitable candidate to provide power and receive power. Currently, the energy management between the ES and the PS is performed only according to state-of-charges of the ES and the PS so the energy management strategy has low efficiency.

It is desirable to provide a system and a method to address at least one of the above-mentioned problems.

BRIEF DESCRIPTION

In accordance with one embodiment disclosed herein, a system is provided. The system includes a bus, at least two converters, an energy-type energy storage unit (ES), a power-type energy storage unit (PS) and a controller. The ES and the PS are coupled in parallel to the bus through corresponding converters of the at least two converters. The controller is configured to control the ES and the PS through the corresponding converters in at least two conditions during a charging mode and a discharging mode: when a power for the ES and PS is below a power threshold, control the power to flow between the ES and the bus; and when the power is above the power threshold, control a part of the power to flow between the ES and the bus and another part of the power to flow between the PS and the bus.

In accordance with another embodiment disclosed herein, a method is provided. The method includes providing an energy-type energy storage unit (ES) and a power-type energy storage unit (PS) coupled in parallel to a bus through corresponding converters. The method further includes controlling the ES and the PS through the corresponding converters in at least two conditions during a charging mode and a discharging mode: when a power for the ES and PS is below a power threshold, controlling the power to flow between the ES and the bus; and when the power is above the power threshold, controlling a part of the power to flow between the ES and the bus and another part of the power to flow between the PS and the bus.

DRAWINGS

These and other features and aspects of the present disclosure will become better understood when the following detailed description is read with reference to the accompanying drawings in which like characters represent like parts throughout the drawings, wherein.

DETAILED DESCRIPTION

Unless defined otherwise, technical and scientific terms used herein have the same meaning as is commonly understood by one of ordinary skill in the art to which this disclosure belongs. The terms "a", and "an" do not denote a limitation of quantity, but rather denote the presence of at least one of the referenced items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect.

Figure 1:
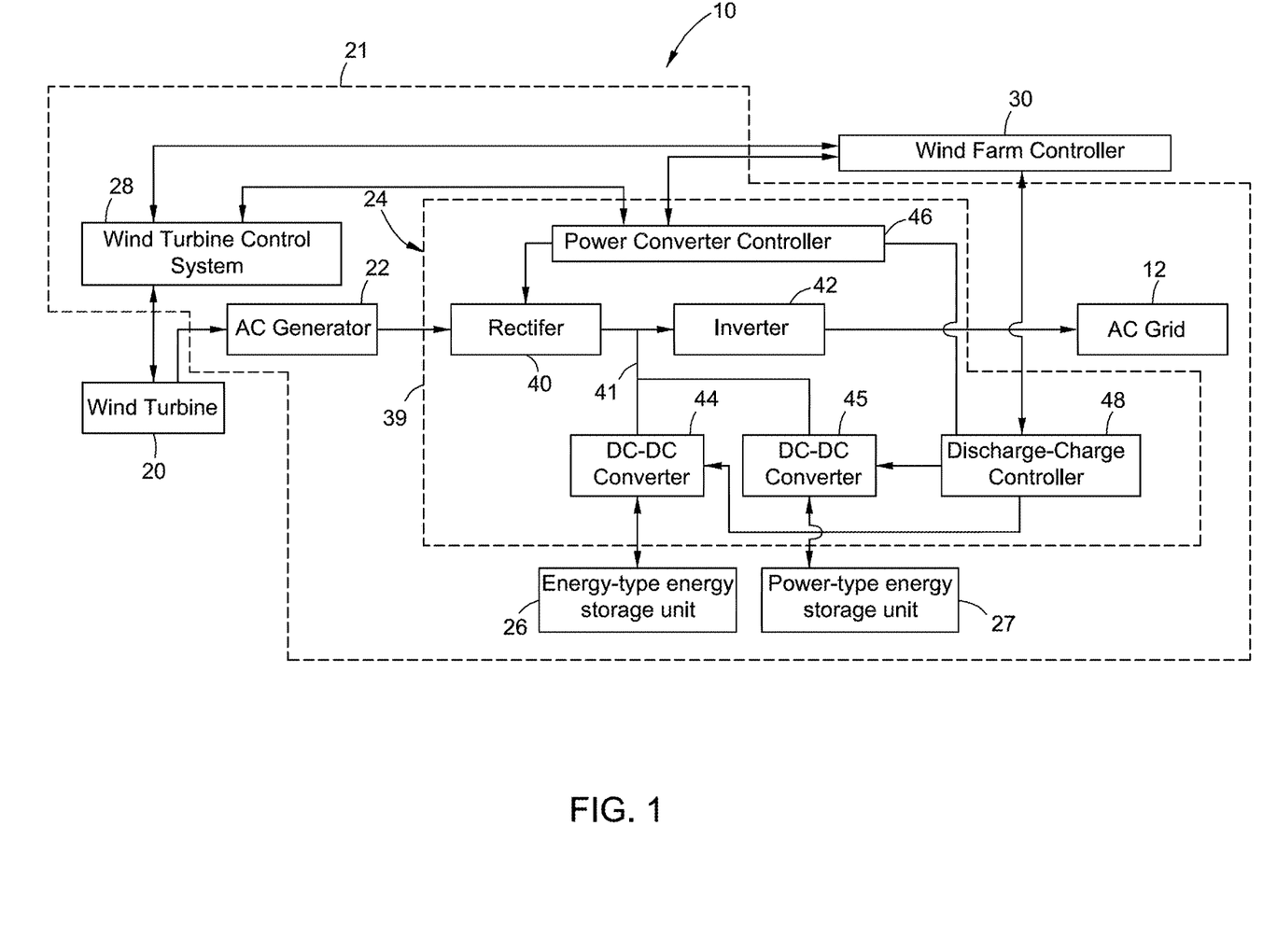
FIG. 1 is a schematic diagram of a wind farm power generation system for delivering electrical power to an AC electrical grid in accordance with an embodiment.

FIG. 1 illustrates a schematic diagram of a wind farm power generation system 10 for delivering electrical power to an AC electrical grid 12 in accordance with an embodiment. The wind farm power generation system 10 includes a wind turbine 20, a wind turbine housing 21, an AC generator 22, a power converter 24, an energy-type energy storage unit (abbreviated to "ES" hereinafter) 26, a power-type energy storage unit (abbreviated to "PS" hereinafter) 27, a wind turbine control system 28, and a wind farm controller 30.

The wind turbine 20 is configured to rotate in response to wind contacting the wind turbine 20 to drive the AC generator 22 such that the AC generator 22 outputs an AC voltage. The wind turbine 20 is operably coupled to the wind turbine controller 28 which can control operation of the wind turbine 20.

The wind turbine housing 21 is configured to enclose the AC generator 22, the power converter 24, the ES 26, PS 27, and the wind turbine controller 28 therein. The wind turbine 20 is rotatably coupled to the wind turbine housing 21.

The power converter 24 is configured to receive the AC voltage from the AC generator 22 and to supply an AC voltage to the AC electrical grid 12. The power converter 24 is further configured to supply a DC voltage to the ES 26 and/or the PS 27 for storing excess electrical energy generated by the AC generator 22, or configured to obtain the DC voltage from the ES 26 and/or the PS 27. The power converter 24 includes a housing 39, a rectifier 40, an inverter 42, a first DC-DC converter 44, a second DC-DC converter 45, a power converter controller 46, and a discharge-charge controller 48. In one embodiment, the housing 39 is configured to hold the rectifier 40, the inverter 42, the first DC-DC converter 44, the second DC-DC converter 45, the controller 46, the discharge-charge controller 48 therein. In another embodiment, the first DC-DC converter 44 and/or the second DC-DC converter 45 are disposed outside of the housing 39. The first DC-DC converter 44 is operably coupled between the DC voltage bus 41 and the ES 26, and the second DC-DC converter 45 is operably coupled between the DC voltage bus 41 and the PS 27.

The rectifier 40 is configured to receive the AC voltage from the AC generator 22 and to rectify the AC voltage to obtain a DC voltage. The rectifier 40 outputs the DC voltage on a DC voltage bus 41. The DC voltage bus 41 routes the DC voltage to the inverter 42, the first DC-DC converter 44 and the second DC-DC converter 45.

The inverter 42 is configured to receive the DC voltage from the DC voltage bus 41 and to convert the DC voltage to an AC voltage that is output from the inverter 42 to the AC electrical grid 12. In particular, the inverter 42 outputs the AC voltage to the AC electrical grid 12 in response to the inverter 42 receiving a control signal from the power converter controller 46. Further, the power converter controller 46 generates the control signal that is received by the inverter 42, in response to the power converter controller 46 receiving a control signal from the wind farm controller 30.

The first DC-DC converter 44 is configured to receive the DC voltage from the DC voltage bus 41. The first DC-DC converter 44 adjusts the voltage level of the DC voltage and outputs a DC voltage to the ES 26 in response to a control signal from the discharge-charge controller 48. The ES 26 receives the DC voltage output from the first DC-DC converter 44 and stores electrical energy therein. The first DC-DC converter 44 is further configured to output a DC voltage on the DC voltage bus 41 utilizing electrical energy from the ES 26 in response to another control signal from the discharge-charge controller 48. Similar to the first DC-DC converter 44, the second DC-DC converter 45 is configured to receive the DC voltage from the DC voltage bus 41. The second DC-DC converter 45 adjusts the voltage level of the DC voltage and outputs a DC voltage to the PS 27 in response to a control signal from the discharge-charge controller 48. The PS 27 receives the DC voltage output from the second DC-DC converter 45 and stores electrical energy therein. The second DC-DC converter 45 is further configured to output a DC voltage on the DC voltage bus 41 utilizing electrical energy from the PS 27 in response to another control signal from the discharge-charge controller 48. In one embodiment, the first DC-DC converter 44 and the second DC-DC converter 45 may be separate devices. In another embodiment, the first DC-DC converter 44 and the second DC-DC converter 45 may be integrated into a device with at least two converting channels respectively coupled with the ES 26 and the PS 27.

The power converter controller 46 is configured to control operation of the power converter 24. In particular, the controller 46 generates a control signal to induce the inverter 42 to output an AC voltage on the AC electrical grid 12, in response to a control signal from the wind farm controller 30. Further, the controller 46 generates another control signal to induce the discharge-charge controller 48 to instruct the first DC-DC converter 44 and/or the second DC-DC converter 45 to store electrical energy in the ES 26 and/or the PS 27. Further, the controller 46 generates another control signal to induce the discharge-charge controller 48 to instruct the first DC-DC converter 44 and/or the second DC-DC converter 45 to output a DC voltage on the DC voltage bus 41 utilizing electrical energy stored in the ES 26 and/or the PS 27. As shown, the power converter controller 46 is operably coupled to the inverter 42, the discharge-charge controller 48, the wind farm controller 30, and the wind turbine control system 28.

The discharge-charge controller 48 is configured to control operation of the first DC-DC converter 44 such that the first DC-DC converter 44 either outputs a DC voltage to the ES 26 to store electrical energy therein or outputs a DC voltage on the DC voltage bus 41. The discharge-charge controller 48 is configured to control operation of the second DC-DC converter 45 such that the second DC-DC converter 45 either outputs a DC voltage to the PS 27 to store electrical energy therein or outputs a DC voltage on the DC voltage bus 41.

The discharge-charge controller 48 is configured to control a bus required power for the ES 26 and the PS 27 flowing between the ES 26 and the DC voltage bus 41 and/or between the PS 27 and the DC voltage bus 41. The bus required power is relative to the DC voltage input or output the DC-DC converters 44 and 45 on the DC voltage bus 41, which is a power flowing from the DC voltage bus 41 to the ES 26 and/or the PS 27 to charge the ES 26 and/or the PS 27, or a power flowing from the ES 26 and/or the PS 27 to the DC voltage bus 41 to discharge the ES 26 and/or the PS 27. The bus required power is split between the ES 26 and the PS 27 according to signals from the discharge-charge controller 48.

The ES 26 is configured to store electrical energy therein in response to receiving a DC voltage from the first DC-DC converter 44. The ES 26 can also output a DC voltage to the first DC-DC converter 44. The term "ES" used herein describes a high specific energy source or high energy density energy source demonstrated to achieve an energy density on the order of 100 W-hr/kg or greater. The ES 26 has a large capacity to provide large energy. The ES 26, in one example, may include a battery or a string of batteries, such as fuel cell, lead-acid cell for example.

The PS 27 is configured to store electrical energy therein in response to receiving a DC voltage from the second DC-DC converter 45. The PS 27 can also output a DC voltage to the second DC-DC converter 45. The PS 27 can provide high current instantly and receive energy with a high rate so as to handle fast power dynamics. The PS 27 may include, for example, an ultra-capacitor. Ultra-capacitors are often referred to as "double-layer" capacitors or supercapacitors. In one example, the ultra-capacitor has 63 cells connected in series wherein each cell has voltage rating of approximately 2.7 volts and a capacitance value that is greater than 1000 Farads per cell.

The wind turbine control system 28 is configured to control operation of the wind turbine 20. In particular, the wind turbine control system 28 can control an operational position of the wind turbine 20, and a maximum rotational speed of the wind turbine in response to a control signal received from the wind farm controller 30.

The wind farm controller 30 is configured to control an amount of output electrical power from the power converter 24 to the AC electrical grid 12. The wind farm controller 30 generates control signals that are received by the wind turbine control system 28, the power converter controller 46 and the discharge-charge controller 48.

A general overview of the operation of the wind farm power generation system 10 will now be provided. The wind farm controller 30 monitors and controls an actual amount of output electrical power from the system 10. Typically, the wind farm controller 30 will instruct the power converter controller 46 to output all generated electrical power to the AC electrical grid 12. However, if a wind speed is high enough to allow the AC generator 22 to produce more electrical power than needed, the wind farm controller 30 can instruct the discharge-charge controller 48 to store at least a portion of the generated electrical energy from the AC generator 22 in the ES 26 and/or the PS 27. If a wind speed is too low for a wind turbine AC generator 22 to output a desired amount of electrical power, the wind farm controller 30 can instruct the power converter 24 and the discharge-charge controller 48 to extract electrical energy from the local ES 26 and/or the PS 27 and to output electrical power on the AC electrical grid 12.

Figure 2:
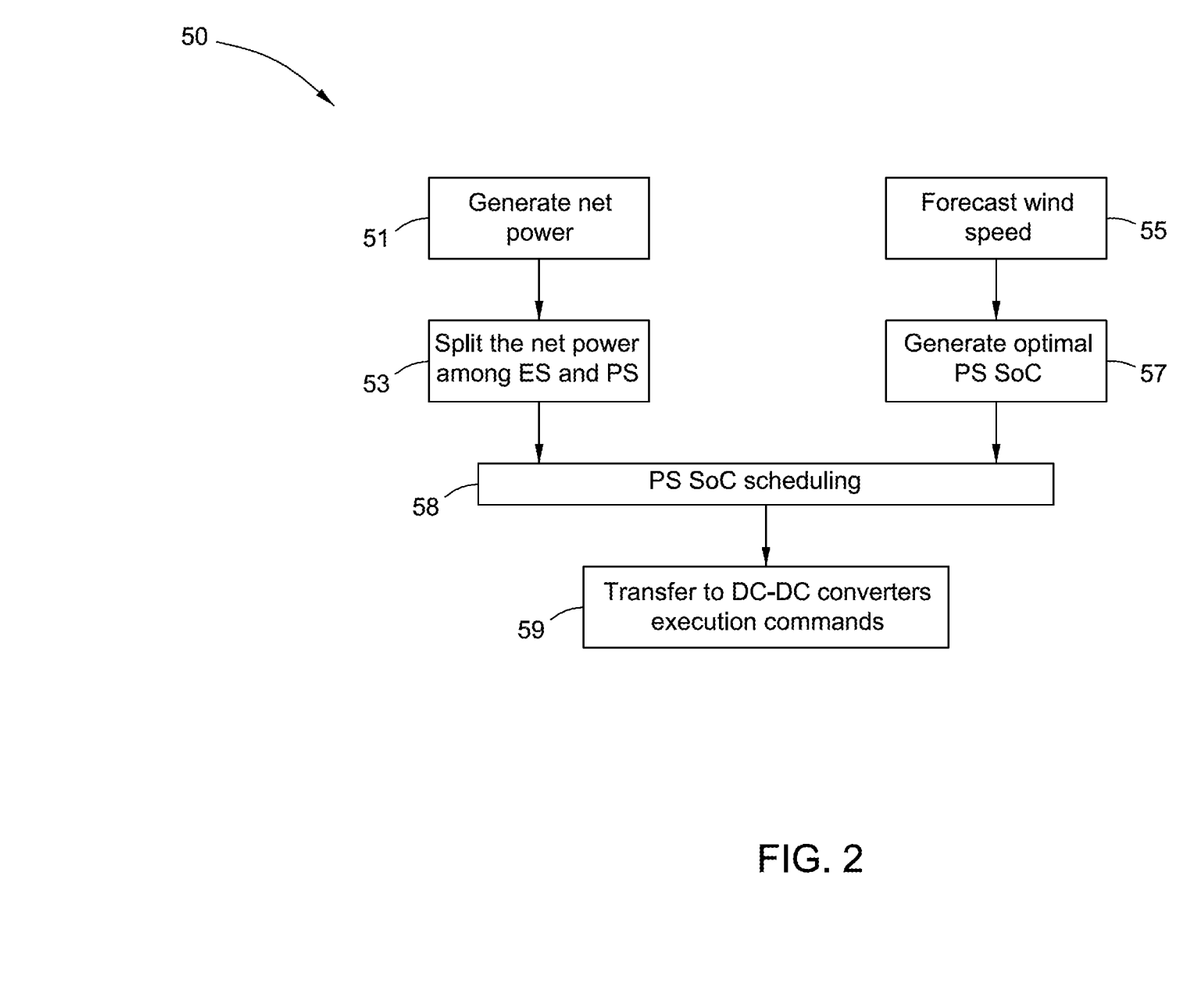
FIG. 2 is a flow chart of an energy management method of managing energy between an energy-type energy storage unit (ES) and a power-type energy storage unit (PS) in accordance with an embodiment.

FIG. 2 illustrates a flow chart of an energy management method 50 of managing energy between the ES 26 and the PS 27 in accordance with an embodiment. In block 51, a net power (or referred as to total required power) for the ES 26 and the PS 27 is generated, which is a total power supply to or output from the ES 26 and the PS 27. The net power is generated based on a difference between the desired amount of electrical power for the AC grid 12 and the actual amount of electrical power generated by the wind turbine 20. The net power is a DC power for the ES 26 and the PS 27, which may be positive or negative. The wind farm controller 30 may be configured to generate the net power. The bus required power mentioned above is defined as an absolute value of the net power during a charging mode and a discharging mode, which is positive. The energy managements in the charging mode and the discharging mode are respectively described with the net power in sequential paragraphs.

In block 53, the net power is split among the ES 26 and the PS 27 to generate an ES initial power command and a PS initial power command. In block 55, wind speed is forecasted. The wind speed may be forecasted through sensors or modeling, for example. The wind farm controller 30 may be assisted to obtain the forecasted wind speed. In block 57, an optimal state-of-charge (SoC) of the PS 27 is generated according to the forecasted wind speed. As used herein "SoC" refers to the level of charge of the PS 27 (the energy remaining in the PS 27) in comparison to the maximum level of charge for the PS 27 expressed in a percentage. The SoC of the PS 27 may be a percentage of a square of a voltage of the PS 27 in comparison to a square of a maximum voltage capacity thereof. The SoC corresponds to the voltage of the PS 27, so an optimal voltage or a voltage requirement for the PS 27 is obtained based on the forecasted wind speed. Typically, the SoC and the voltage requirement of the PS 27 are high when the forecasted wind speed is low, so that the PS 27 are prepared to output energy to the AC grid 12. The SoC and the voltage requirement of the PS 27 are low when the forecasted wind speed is high, so that the PS 27 has enough capacity to receive a part of energy generated by the wind turbine 20.

The voltage requirement $V_{PS}$ of the PS 27 is expressed by the follow expression:

$$V_{PS} = V_{max} \cdot \sqrt{f(V_{forecast})}$$

Where, $V_{max}$ is a maximum voltage or a rated voltage of the PS 27. $V_{forecast}$ is the forecast wind speed. $f(V_{forecast})$ is a monotonically decreasing function relative to $V_{forecast}$. When the forecasted wind speed is large, the SoC and the power requirement of the PS 27 intend to save certain space to store the potential large charging power.

In block 58, an ES power command and a PS power command are generated based on the ES initial power command, the PS initial power command and the SoC (or the voltage requirement) of the PS 27. In some conditions, the ES initial power command and/or the PS initial power command may be adjusted based on the SoC of the PS 27 to obtain the ES power command and the PS power command. The discharge-charge controller 48 may be configured to perform the actions in blocks 53, 57 and 58.

In block 59, the discharge-charge controller 48 provides command signals to the DC-DC converter 44 and 45 according to the ES power command and the PS power command, and the DC-DC converter 44 and 45 execute commands in response to the command signals.

Figure 3:
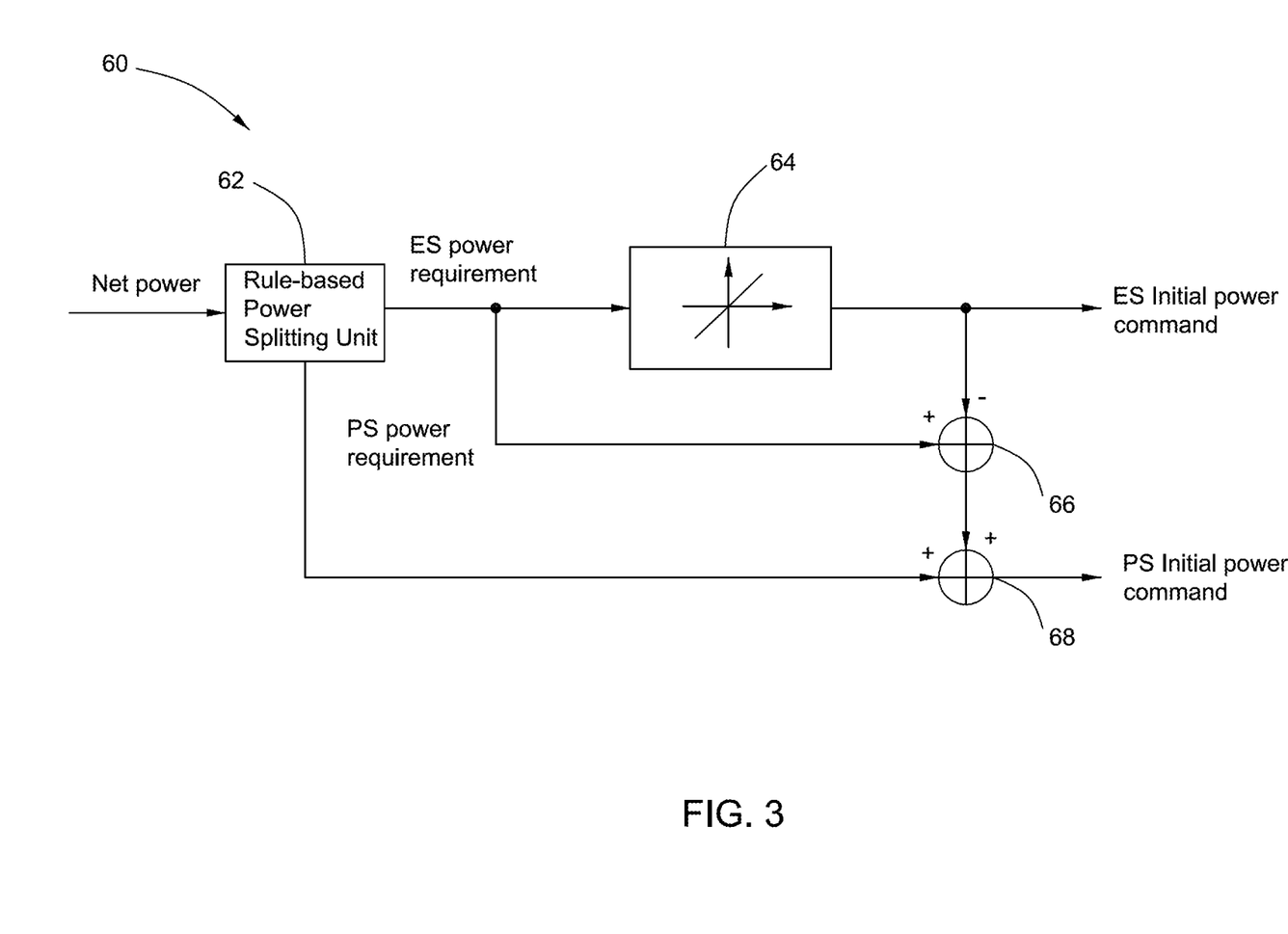
FIG. 3 is a schematic diagram of a power split unit performing splitting a net power of FIG. 2 in accordance with an embodiment.

FIG. 3 illustrates a schematic diagram of a power split unit 60 performing splitting the net power in the block 53 in FIG. 2 in accordance with an embodiment. The power split unit 60 may be a part of the discharge-charge controller 48 in one embodiment. The splitting the net power with the power split unit 60 is described in detail hereinafter. A rule-based power splitting unit 62 is configured to receive the net power and generate an ES power requirement and a PS power requirement based on a power splitting rule.

Figure 4:
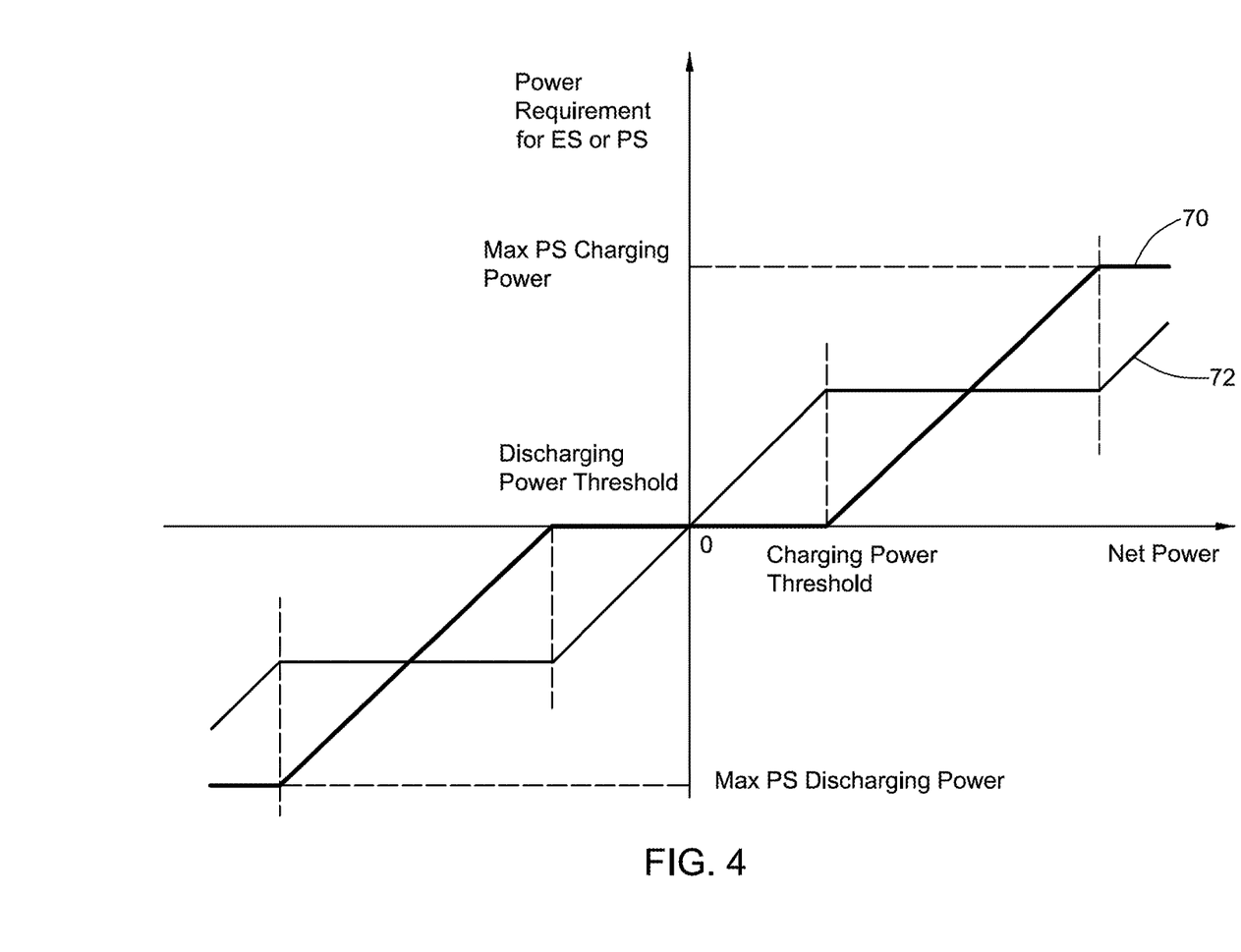
FIG. 4 is a graphical illustration of a power splitting rule in an embodiment.

With reference of FIG. 4, a graphical illustration of the power splitting rule in an embodiment is shown. The abscissa axis represents the net power for the ES 26 and the PS 27, and the ordinate axis represents the power requirement for the ES 26 or the PS 27. Wave 70 illustrates a relationship between the power requirement of the PS 27 and the net power, and wave 72 illustrates a relationship between the power requirement of the ES 26 and the net power.

The ES 26 and the PS 27 may operate in the charging mode and the discharging mode. Under the charging mode, the power generated by the wind turbine 20 is larger than the desired power of the AC grid 12 and a part of the power (the net power) from the wind turbine 20 is supplied to the ES 26 and/or the PS 27. Under the discharging mode, the power generated by the wind turbine 20 is less than the desired power of the AC grid 12 and a part of the desired power (the net power) for the AC grid 12 is supplied by the ES 26 and/or the PS 27. In this embodiment, the net power is positive during the charging mode while the net power is negative during the discharging mode. In an alternative embodiment, the net power is negative in changing while positive in discharging. In this embodiment, a sum of the power requirements for the ES 26 and the PS 27 is equal to the net power.

In the charging mode, the net power is split between the ES 26 and the PS 27 in at least two conditions. In one condition that the net power is below a charging power threshold, the total of the net power is supplied to the ES 26.

In another condition that the net power is above the power threshold, the net power is supplied to both the ES 26 and the PS 27. In this embodiment, the part of the net power supplied to the ES 26 is substantially equal to the charging power threshold and the rest of the net power is supplied to the PS 27 when the power supplied to the PS 27 is less than a maximum PS charging power thereof. The maximum PS charging power represents a maximum power which the PS 27 can be charged, which is determined according to the capacity of the PS 27. In another embodiment, the power supplied to the ES 26 rises slightly with the net power rising, and the rest of the net power is supplied to the PS 27. Accordingly, the PS 27 handles the quick increment of the net power since the PS 27 is charged fast.

The PS 27 is charged by the maximum PS charging power when the net power is higher than a sum of the maximum PS charging power and the charging power threshold in the condition that the net power is above the power threshold. The ES 26 is charged by the rest of the net power.

Similar to the charging mode, in the discharging mode, when an absolute value of the net power is less than that of a discharging power threshold, the ES 26 provides the total of the net power. Otherwise, the ES 26 and the PS 27 both provide the net power. Further in the condition that the absolute value of the net power is not less than that of the discharging power threshold, when the absolute value of the net power is less than that of a maximum PS discharging power, the power requirement of the ES 26 is substantially equal to the discharging power threshold, i.e., the power provided by the ES 26 is substantially equal to the absolute value of the discharging power threshold, and the rest of the absolute value of the net power is provided by the PS 27. The maximum PS discharging power represents a maximum power which the PS 27 can provide, which is determined according to the capacity of the PS 27. In another embodiment, the power provided by the ES 26 rises slightly with the absolute value of the net power rising. When the absolute value of the net power is not less than that of the maximum PS discharging power, the PS 27 provides the power equal to the absolute value of the maximum PS discharging power, and the ES 26 provides the rest.

The charging power threshold and the discharging power threshold are determined according to lifetime of the ES 26 and abilities of the PS 27 on charging and discharging, in order to protect the ES 26, extend life of the ES 26, and rational use the capacity of the PS 27. The ES 26 provides or receives a smooth power and the PS 27 can handle the fast changing power.

Continuation to referring to FIG. 3, in the illustrated embodiment, a slew rate limiter 64 is configured to limit a dynamic change rate of the ES power requirement to generate the ES initial power command, so that a decreasing or increasing rate of the ES power requirement is not larger than a certain slew rate value determined in the slew rate limiter 64. The certain slew rate value may be determined according to characters of the ES 26 to avoid the ES 26 charging or discharging too fast. In another embodiment, a low-pass filter may be utilized instead of the slew rate limiter to limit the ES power requirement to achieve the same function. In another embodiment, the slew rate limiter 64 and the low-pass filter may be omitted.

A difference between the ES power requirement and the ES initial power command of the ES 26 is added to the PS power requirement of the PS 27 through summators 66 and 68 to generate the PS initial power command for the PS 27. Accordingly a sum of the ES initial power command and the PS initial power command is equal to a sum of the ES power requirement and the PS power requirement.

Figure 5:
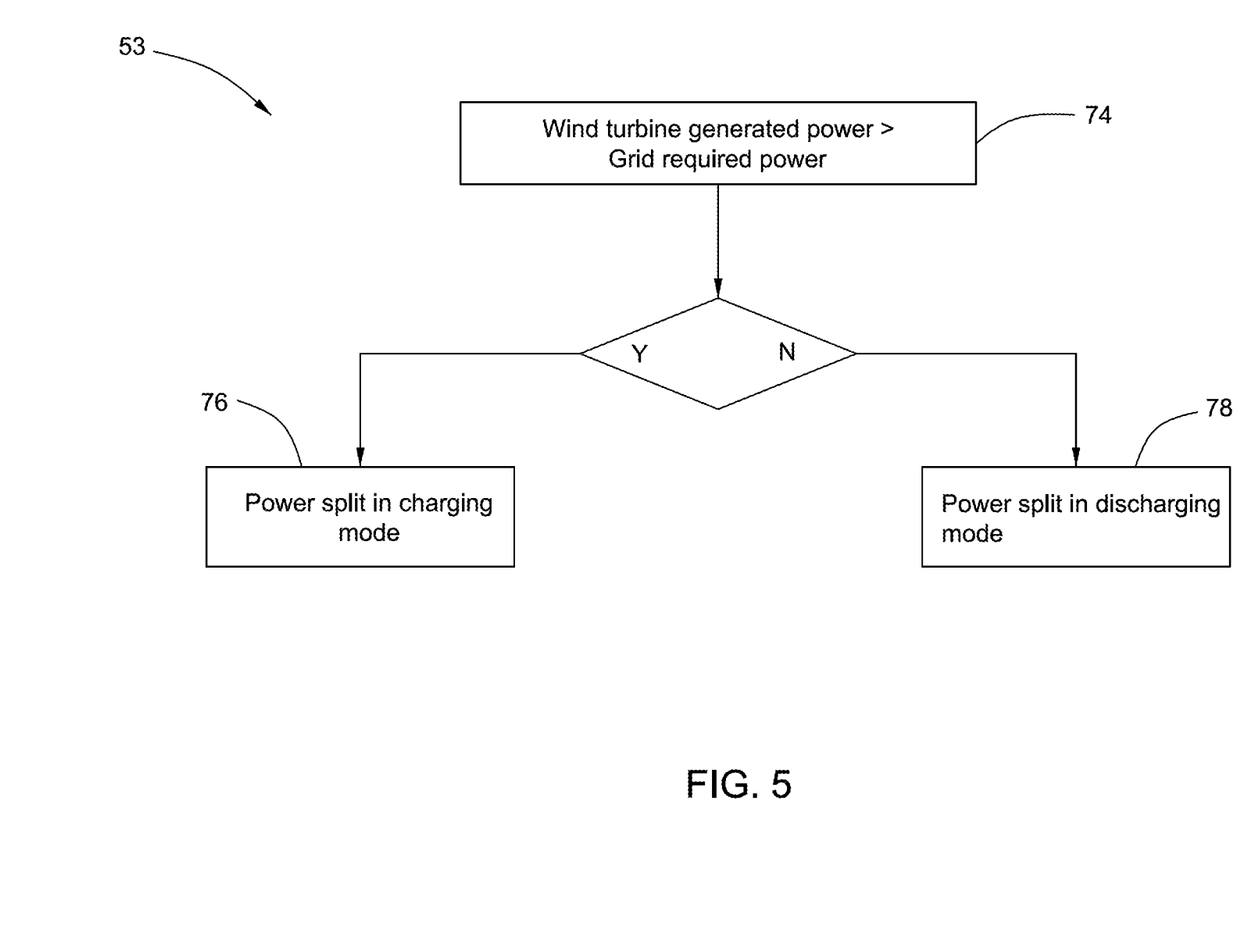
FIGS. 5 to 7 are flow charts of a splitting the net power process in FIG. 2 in accordance with an embodiment.
Figure 6:
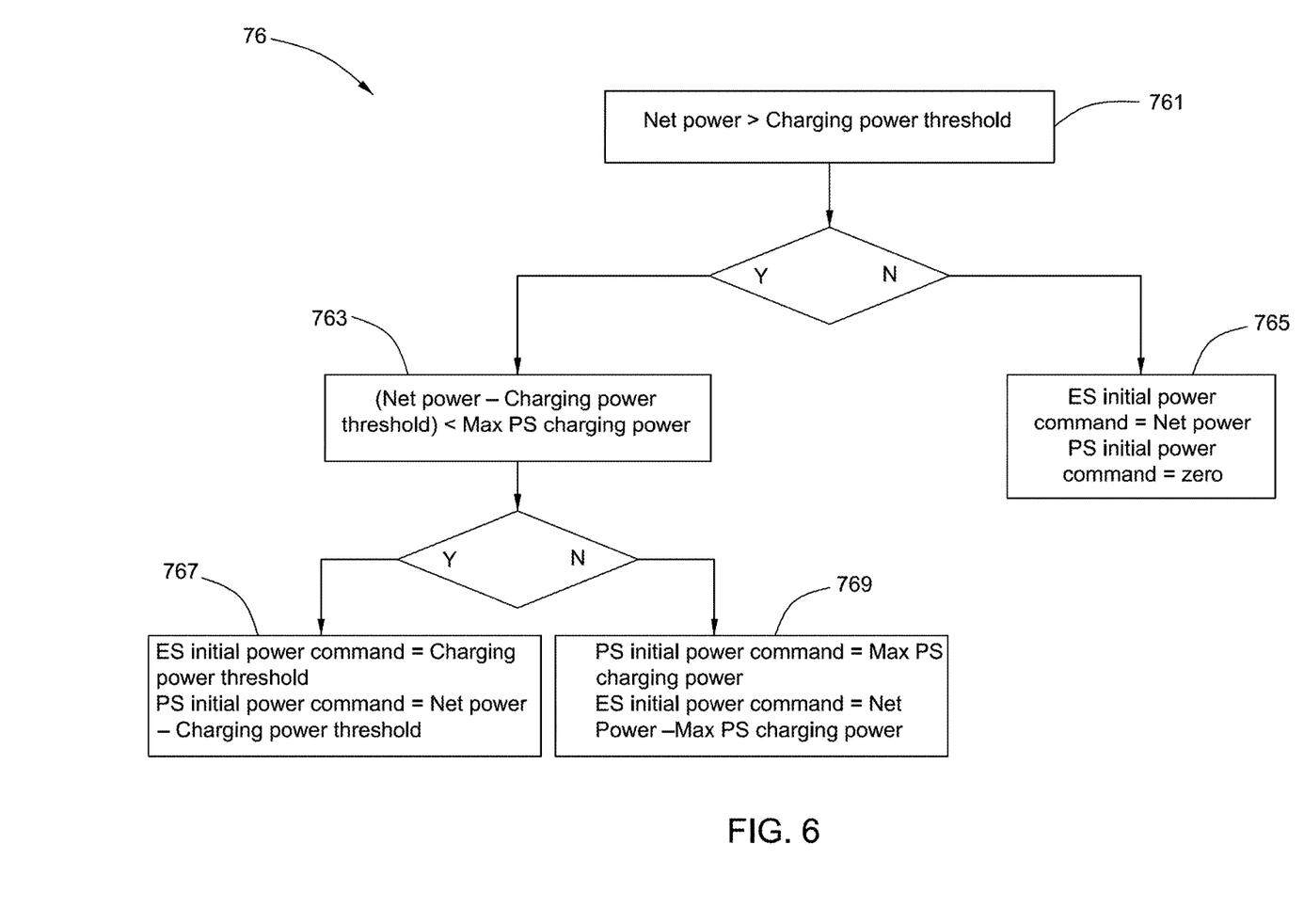
Figure 7:
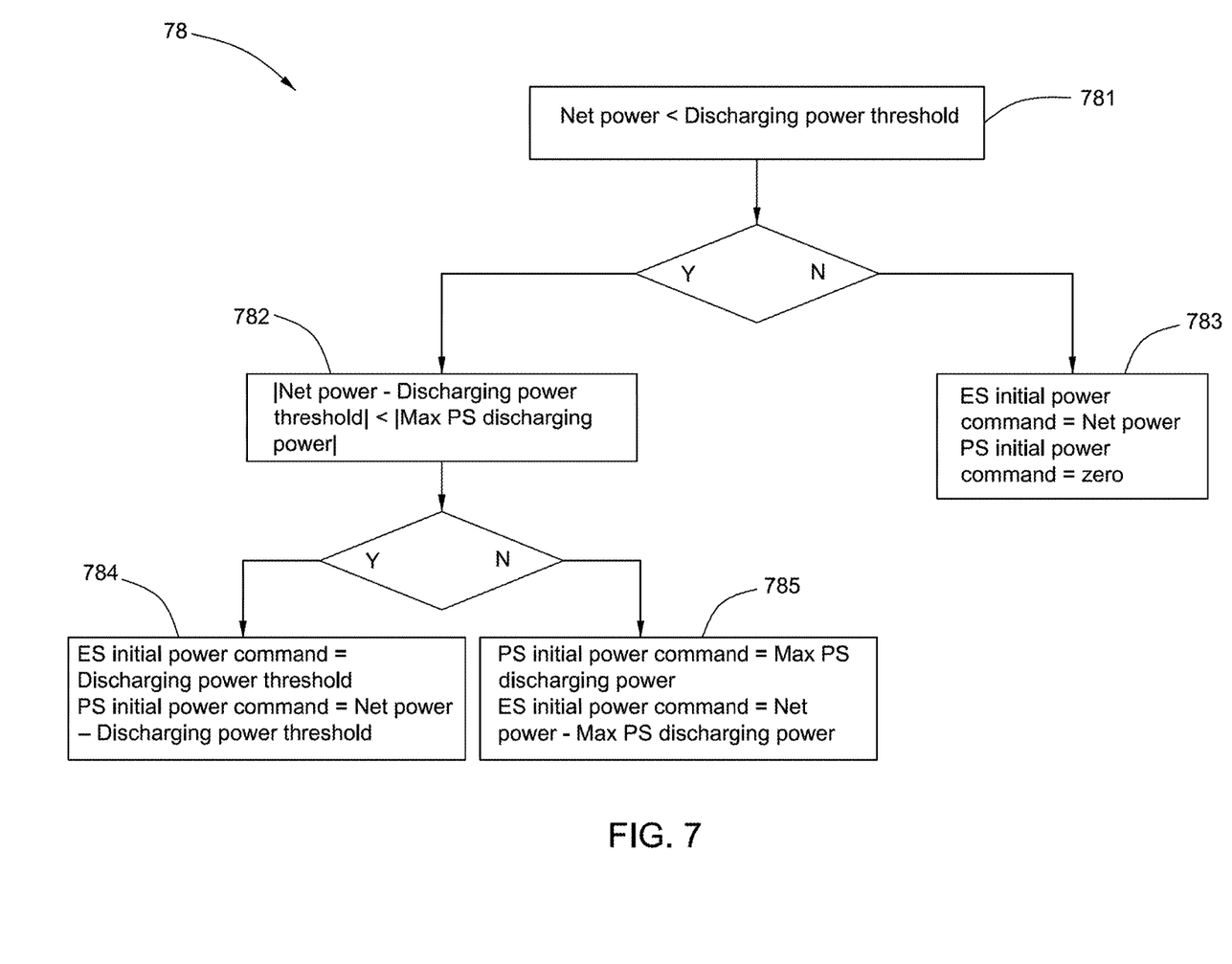

FIGS. 5 to 7 illustrate flow charts of the splitting the net power process in the block 53 in FIG. 2 in accordance with an embodiment. Referring to FIG. 5, in block 74, the wind turbine generated power and the grid required power are compared. If the wind turbine generated power is greater than the grid required power, i.e., the net power is positive, the net power is split in the charging mode as shown in block 76. The ES 26 and/or the PS 27 are charged by the power from the wind turbine 20. Otherwise, the net power is split in the discharging mode as shown in block 78. The ES 26 and/or the PS 27 provide power to the AC grid 12.

FIG. 6 illustrates a sub-flowchart of power splitting in the charging mode in the block 76 of FIG. 5 in accordance with an embodiment. In block 761, the net power and the charging power threshold are compared. In block 763, when the net power is higher than the charging power threshold, the maximum PS charging power and a difference between the net power and the charging power threshold are compared to determine if the PS 27 has ability to receive the power.

In block 767, if the PS 27 can receive the power, the ES 26 is supplied with the ES initial power command being equal to the charging power threshold and the PS 27 is supplied with the rest of the net power (the PS initial power command). The rest of the net power is the difference between the net power and the charging power threshold, which is less than the maximum PS charging power. Otherwise, in block 769, the PS 27 is supplied with the PS initial power command being equal to the maximum PS charging power and the ES 26 is supplied with the rest of the net power (the ES initial power command).

In block 765, in the condition that the net power is below the charging power threshold, the ES 26 is supplied with the total net power. The ES initial power command is equal to the net power and the PS initial power command is zero.

FIG. 7 illustrates a sub-flowchart of power splitting in the discharging mode in the block 78 of FIG. 5 in accordance with an embodiment. In block 781, the net power and the discharging power threshold are compared. In block 782, when the net power is less than the discharging power threshold, i.e., the absolute value of the net power is larger than the absolute value of the discharging power threshold, the absolute value of the maximum PS discharging power and an absolute value of a difference between the net power and the discharging power threshold are compared to determine if the PS 27 can supply the power. In this embodiment, the net power, the discharging power threshold and the maximum PS discharging power are negative in the discharging mode, so the absolute values or negative values thereof are utilized to compare or calculate. In another embodiment, the net power, the discharging power threshold and the maximum PS discharging power are positive in the discharging mode, so the values thereof are utilized directly. In another embodiment, in the charging mode, the net power, the charging power threshold and the maximum PS charging power are negative, so the absolute values or negative values thereof are utilized.

In block 784, if the PS 27 can supply the power, the ES 26 provides the power being equal to the absolute value of the discharging power threshold, i.e., the ES initial power command is equal to the discharging power threshold, and the PS initial power command is equal to the difference between the net power and the discharging power threshold. Otherwise, in block 785, the PS initial power command is equal to the maximum PS discharging power and the ES initial power command is equal to the difference between the net power and the maximum PS discharging power.

In block 783, in the condition that the net power is not less than the discharging power threshold, the ES 26 provides the power being equal to the absolute value of the net power. The ES initial power command is equal to the net power and the PS initial power command is zero.

Figure 8:
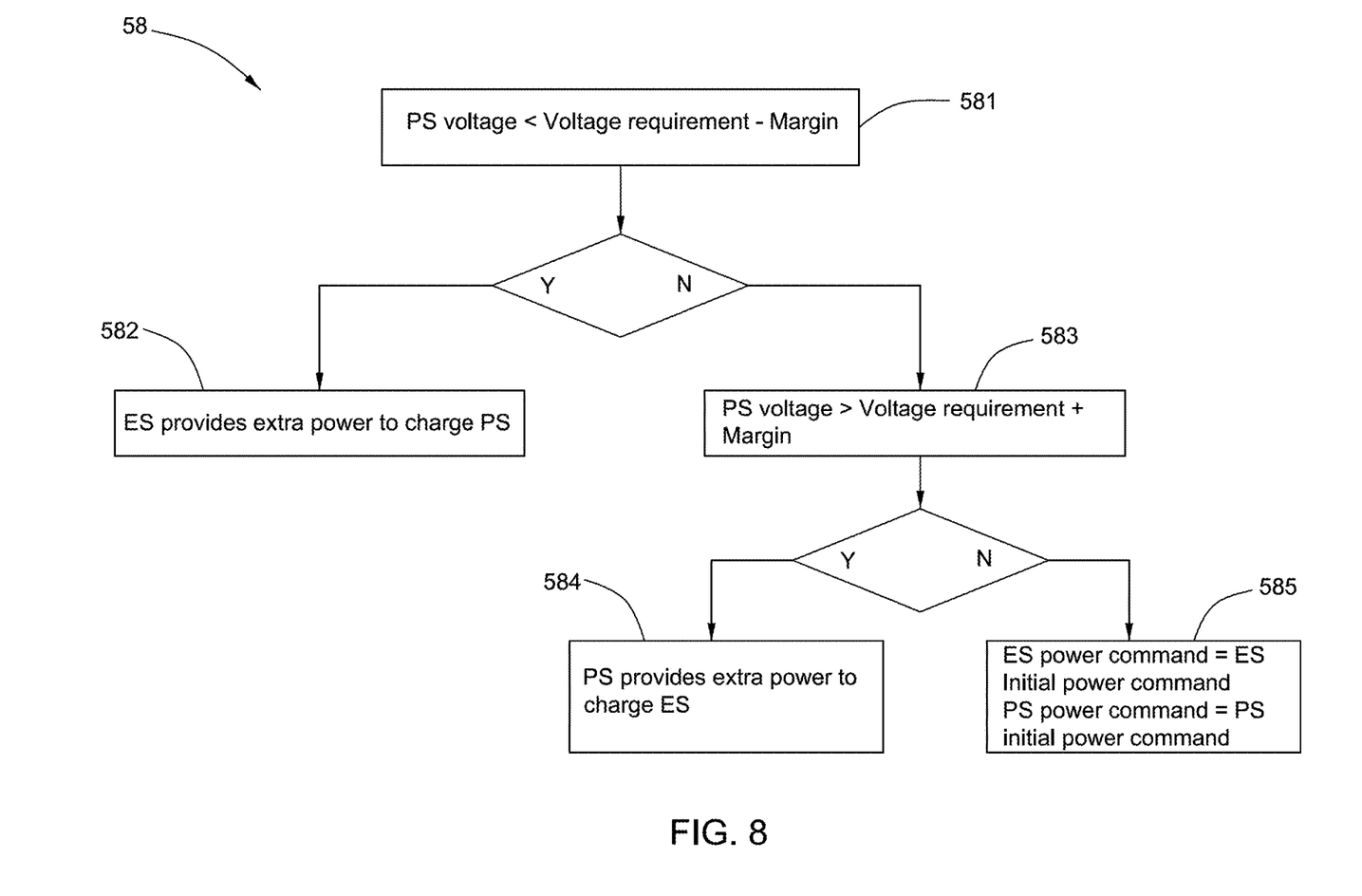
FIG. 8 is a sub-flowchart of a PS stage-of-charge scheduling in FIG. 2 in accordance with an embodiment.

FIG. 8 illustrates a sub-flowchart of the PS SoC scheduling in the block 58 of FIG. 2 in accordance with an embodiment. The voltage of the PS 27 is compared with the voltage requirement. In this embodiment, there is a voltage range around the voltage requirement, which has a narrow band with an upper limit and a lower limit. The upper limit is a little higher than the voltage requirement and the lower limit is a little lower than the voltage requirement. For example, the upper limit is the voltage requirement added by a margin which, in a non-limiting example, is 5 Volt (V), and the lower limit is the voltage requirement subtracted by the margin or another small value. In this embodiment, the voltage of the PS 27 is compared with the lower limit in block 581.

In block 582, the ES 26 provides extra power to charge the PS 27 when the voltage of the PS 27 is lower than the lower limit. The ES initial power command and the PS initial power command are adjusted based on the extra power from the ES 26 to the PS 27 to generate the ES power command and the PS power command.

In block 583, the voltage of the PS 27 is further compared with the upper limit when the voltage of the PS 17 is not lower than the lower limit. In block 584, the PS 27 provides extra power to charge ES when the voltage of the PS 27 is higher than the upper limit. The ES initial power command and the PS initial power command are adjusted based on the extra power from the PS 27 to the ES 26. In block 585, the ES power command is equal to the ES initial power command and the PS power command is equal to the PS initial power command when the voltage of the PS 27 is in the voltage range. Accordingly, the voltage of the PS 27 is always maintained in the voltage range, so that the PS 27 is always prepared to supply power to the AC grid 12 when the forecasted wind speed is low or receive power from the wind turbine 20 when the forecasted wind speed is high.

In another embodiment, the voltage of the PS 27 is compared with the upper limit, and then the voltage of the PS 27 is compared with the lower limit when the voltage is not higher than the upper limit.

While embodiments of the invention have been described herein, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

Furthermore, the skilled artisan will recognize the interchangeability of various features from different embodiments. The various features described, as well as other known equivalents for each feature, can be mixed and matched by one of ordinary skill in this art to construct additional systems and techniques in accordance with principles of this disclosure.

The invention claimed is:

1. A system comprising:
a bus;
at least two converters;
an energy-type energy storage unit (ES);
a power-type energy storage unit (PS), the ES and the PS being coupled in parallel to the bus through corresponding converters of the at least two converters; and
a controller configured to control the ES and the PS through the corresponding converters in at least two conditions during a charging mode and a discharging mode:
when a bus required power for the ES and the PS is below a power threshold, control the bus required power to flow between the ES and the bus; and
when the bus required power is above the power threshold, control a part of the bus required power to flow between the ES and the bus and another part of the bus required power to flow between the PS and the bus.

2. The system of claim 1, wherein the controller is configured to control a power to flow between the ES and the PS when a voltage of the PS is out of a voltage requirement range to remain the voltage of the PS in the voltage requirement range.

3. The system of claim 2, wherein the controller is configured to forecast a wind speed and generate a voltage requirement for the PS according to the wind speed, and wherein the voltage requirement range is around the voltage requirement.

4. The system of claim 3, wherein the controller is configured to generate the voltage requirement for the PS according to a rated voltage of the PS.

5. The system of claim 1, wherein the controller is configured to control the part of the bus required power flowing between the ES and the bus being equal to the power threshold when the power flowing through the PS is less than a maximum PS power thereof in the condition that the bus required power for the ES and the PS is above the power threshold.

6. The system of claim 1, wherein the controller is configured to control the part of the bus required power flowing between the PS and the bus being equal to a maximum PS power thereof when the bus required power for the ES and the PS is higher than a sum of a maximum PS power and the power threshold in the condition that the bus required power for the ES and the PS is above the power threshold.

7. The system of claim 1, wherein the controller comprises a slew rate limiter configured to limit a dynamic change rate of the power flowing between the ES and the bus.

8. The system of claim 1, wherein the controller comprises a low-pass filter to filter the power flowing between the ES and the bus.

9. The system of claim 1, further comprising a power generation device configured to generate AC power.

10. The system of claim 9, wherein the controller is configured to generate the bus required power for the ES and the PS based on a difference between the AC power generated by the power generation device and a required power of a grid.

11. A method of operating a power generation system, the power generation system comprising a bus, converters, an energy-type storage unit (ES) and a power-type energy storage unit (PS), the ES and the PS being coupled in parallel to the bus through corresponding converters, the method comprising:
controlling the ES and the PS through the corresponding converters in at least two conditions during a charging mode and a discharging mode:
when a bus required power for the ES and the PS is below a power threshold, controlling the bus required power to flow between the ES and the bus; and
when the bus required power is above the power threshold, controlling a part of the bus required power to flow between the ES and the bus and another part of the bus required power to flow between the PS and the bus.

12. The method of claim 11, further comprising controlling a power to flow between the ES and the PS when a voltage of the PS is out of a voltage requirement range to remain a voltage of the PS in the voltage requirement range.

13. The method of claim 12, further comprising forecasting a wind speed and generating a voltage requirement for the PS according to the wind speed, and wherein the voltage requirement range is around the voltage requirement.

14. The method of claim 13, wherein the voltage requirement for the PS is generated according to a rated voltage of the PS.

15. The method of claim 11, wherein the part of the bus required power flowing between the ES and the bus is equal to the power threshold when power flowing through the PS is less than a maximum PS power thereof in the condition that the bus required power for the ES and the PS is above the power threshold.

16. The method of claim 11, wherein the part of the bus required power flowing between the PS and the bus is equal to a maximum PS power thereof when the bus required power for the ES and the PS is higher than a sum of the maximum PS power and the power threshold in the condition that the bus required power for the ES and the PS is above the power threshold.

17. The method of claim 11, further comprising limiting a dynamic change rate of the power flowing between the ES and the bus via a slew rate limiter.

18. The method of claim 11, further comprising filtering the power flowing between the ES and the bus via a low-pass filter.

19. The method of claim 11, further comprising generating AC power via a power generation device.

20. The method of claim 19, wherein the bus required power for the ES and the PS is generated based on a difference between the AC power generated by the power generation device and a required power of a grid.

* * * * *